(12) United States Patent
Ben Jemaa et al.

(10) Patent No.: US 9,690,546 B2
(45) Date of Patent: Jun. 27, 2017

(54) METHOD AND SYSTEM FOR TRANSITIVE TRAVERSAL SERVICE DISCOVERY

(71) Applicant: Software AG, Darmstadt (DE)

(72) Inventors: Jameleddine Ben Jemaa, Hamburg (DE); Marc Dorchain, Heining-les-Bouzonville (FR)

(73) Assignee: Software AG, Darmstadt (DE)

( * ) Notice: Subject to any disclaimer, the term of this patent is extended or adjusted under 35 U.S.C. 154(b) by 457 days.

(21) Appl. No.: 14/226,348

(22) Filed: Mar. 26, 2014

(65) Prior Publication Data
US 2015/0278395 A1    Oct. 1, 2015

(51) Int. Cl.
*G06F 17/30*    (2006.01)
*G06F 9/44*    (2006.01)

(52) U.S. Cl.
CPC .......... *G06F 8/10* (2013.01); *G06F 17/30958* (2013.01)

(58) Field of Classification Search
CPC ................................................ G06F 17/30958
See application file for complete search history.

(56) References Cited

U.S. PATENT DOCUMENTS

| | | | | |
|---|---|---|---|---|
| 6,782,511 B1 * | 8/2004 | Frank | ................... | G06F 17/5045 716/102 |
| 7,617,184 B2 * | 11/2009 | Ferrari | .............. | G06F 17/30873 |
| 7,920,532 B2 | 4/2011 | Zhang | | |
| 8,195,693 B2 * | 6/2012 | Syeda-Mahmood | ......... | G06F 17/30286 707/790 |
| 2001/0045952 A1 * | 11/2001 | Tenev | ................... | G06T 11/206 345/440 |
| 2004/0230636 A1 * | 11/2004 | Masuoka | .............. | G06F 9/4443 708/800 |
| 2006/0136428 A1 * | 6/2006 | Syeda-Mahmood | ......... | G06F 17/30286 |
| 2006/0177004 A1 * | 8/2006 | Gilbert | ................... | H04L 43/12 379/40 |

(Continued)

OTHER PUBLICATIONS

Cardosa, Jorge, et al., "Open Service Network Analysis", May 1, 2013.

(Continued)

*Primary Examiner* — Robert Beausoliel, Jr.
*Assistant Examiner* — Nirav K Khakhar
(74) *Attorney, Agent, or Firm* — Posz Law Group, PLC

(57) ABSTRACT

A computer system includes a processor and an electronic storage. The processor provides a service composition tree of services which are offered, wherein the tree is hierarchical and specifies relationships of the services which are offered within the service composition tree to each other; translates service composition trees and the relationships of the services represented in the trees into a directed acyclic graph (DAG) that represents the service composition trees, the DAG being redundancy-free; and performs a transitive traversal within the DAG among the services represented in the DAG to locate information, within the DAG, regarding the services, in relation to each other. The electronic storage stores the DAG accessed by the processor. A method according to the above will perform a transitive traversal service discovery of a DAG that is redundancy-free, and optionally is minimal weighted. A non-transitory computer-readable medium can perform the method.

20 Claims, 17 Drawing Sheets

(56) References Cited

U.S. PATENT DOCUMENTS

| | | | |
|---|---|---|---|
| 2006/0200548 A1* | 9/2006 | Min | H04L 43/12 709/224 |
| 2009/0222249 A1* | 9/2009 | Wang | G06F 11/3608 703/13 |
| 2011/0137930 A1* | 6/2011 | Hao | G06F 17/30958 707/769 |
| 2012/0254431 A1 | 10/2012 | Kylau et al. | |
| 2014/0032617 A1* | 1/2014 | Stanfill | G06F 17/30557 707/809 |

OTHER PUBLICATIONS

Jin, Jing, "Similarity of Weighted Directed Acyclic Graphs", Aug. 31, 2006.

\* cited by examiner

FIG. 9

```
Class Node<Item> {

Item item;        // The object representing the node. In our case this is an USDL service Node<Item> next;  // The successor object related to the current item Node(Item currentNode, Node nextNode) {  // Constructor This.item = currentNode;

This.next = nextNode;

}

Add(Node successor) {

This.next = successor;

}

Remove(Node successor) {

This.next = null;

```
Class Link<Item> {

Node<Item> source;        // Parent item

Node<Item> destination;   // child item

Link(Node parent, Node child) {    // Constructor

This.source = parent;

This.destination = child;

```
Class Graph<Item> {

Item root;

List<Node> vertices;

List<Link> paths;

Graph(Item start) { // Constructor

This.root = start;

Init();

}

Init() { // Populate the graph with the corresponding nodes and vertices propagated from the root.

Iterate(root);

}

Iterate(Item from) {    // primitive recursive graph topology construction method If from is a leaf then return;

// else…

Item to = successor(from)

Node parent = new Node(from, to);

Link edge = new Link(parent, parent.next);

Vertices.add(parent, parent.next);

Paths.add(edge);

Iterate(to);

```
List<Node> parents(Node n) {

List<Node> parents = null;

For (Node vertex in this.vertices) {

If (vertex.next == n) then parents.add(vertex);

}

Return parents;

}

List<Node> ancestor(Node n) {

List<Node> ancestors.add(ancestor(parent(n));

Return ancestors;

}

List<Node> children(Node n) {

List<Node> childrenList = null;

For (Node vertex in this.vertices) {

If (n.next == vertex) then childrenList.add(vertex);

}

Return childrenList;

}

List<Node> successor(Node n) {

For (Node vertex in children(n) {

List<Node> successors.add(successor(vertex));

}

Return successors;

```
Import usdl.*;

Import Graph.*;

Import xquery;

Class USDLServiceGraph {

Graph<USDLService> serviceGraph;

USDLService root;

USDLServiceGraph(USDLService start) {

This.root = start;

serviceGraph = new Graph<USDLService>(this.root); // This will
instantiate the service graph

}

// Specifying the service parents gives deeper information about its
composition or bundling contribution List<USDLService> getParents(USDLService service) {

List<USDLService> parents = Graph<USDLService>.parents(service);

}

// Specifying the service children gives further details about its
composition or bundling state List<USDLService> getChildren(USDLService service) {

List<USDLService> children = Graph<USDLService>.children
(service);

```
// Specifying the bundled adjacent services of a service gives a
deeper insight about its bundling context List<USDLService> getBundleAdj(USDLService service) {

List<USDLService> adjs = null;

List<USDLService> parents = getParents(service);

For (USDLService parent in parents) {

If (isBunlde(parent) then adjs.add(children(parent))

}

Return adjs;

}

// Specifying the composita adjacent services of a service gives a
deeper insight about its composition nature List<USDLService> getCompositaAdj(USDLService service) {

List<USDLService> composita = null;

List<USDLService> parents = getParents(service);

For (USDLService parent in parents) {

If (isComposite(parent) then composita.add(children(parent))

}

Return composita;

}

List<USDLService> discoverUsdlServices(String keyword) {

List<USDLService> services = xquery("select service from
CentraSite where attribute like keyword");

Return services;

```
tuneupDiscoverResult(String keyword) {

List<USDLService> services = discoverUsdlServices(keyword);

For (USDLService service in services) {

Print(link(service.name), service.description, service.quote);
// Service name as a link to jump to service details Print(link(getParents(service))); // Links to parents details Print(link(getChildren(service))); // Links to children
details Print(link(getBundleAdj (service))); // Links to bundle
adjacent details Print(link(getCompositaAdj (service))); // Links to composite
adjacent details

}
  }
}
```

METHOD AND SYSTEM FOR TRANSITIVE TRAVERSAL SERVICE DISCOVERY

TECHNICAL FIELD

The technical field relates in general to service description language in the information sciences, and more particularly to providing a framework for services described therein.

BACKGROUND

In our more and more mobile and highly dynamic driven world as well as with the increasing tendency of the IT main stream to move towards cloud computing, the service orientation aspect increasingly becomes a core subject. Especially within the cloud context, almost everything is identified as X-As-A-Service, thus giving services more than a simple restricted technical meaning.

Under these circumstances, the term "service" covers a wide spectrum of usage and real world behavior that almost all the established service descriptions are unable to fit to. The available languages focus just on either pure technical attributes such as WSDL or WADL for web services or on sensitive characteristics such as WSML for ontological models. Useful and efficient frameworks for service discovery in this rapidly expanding environment have not been explored.

In order to meet in particular the nonfunctional requirements of service specifications, the inventors observe that what is needed is a corresponding description instrument. Until now there is only USDL, with the essential capability and commitment qualified to fill in this nontechnical gap through giving an adequate real world model for services, the way they are envisaged to work.

SUMMARY

Accordingly, one or more embodiments provide a computer system which includes a processor. The processor is configured to provide a hierarchical service composition tree of services. The processor also translates plural service composition trees and the relationships of the services represented in the plural trees into a directed acyclic graph (DAG) that represents the plural service composition trees, the DAG being redundancy-free. The processor also performs a transitive traversal within the DAG among the services represented in the DAG to locate information, within the DAG, regarding the services, in relation to each other. The computer system also can include an electronic storage which is cooperatively operable with the processor, and configured to store, for example, the DAG.

In accordance with another embodiment, the DAG is weighted with regard to performance and the transitive traversal of the DAG favors a path determined to be minimal and determined to have a better performance.

In still another embodiment, the services which are in the trees of service composition are formatted according to a service description language format, and data of the services contained in the service description language format in the service composition tree are translated into the DAG, and a direction among nodes representing services within the DAG is prescribed from interdependencies of the services which are determined from the plural trees of service composition.

In a further embodiment, the DAG is further structured to conserve links that already associate services represented by nodes in the service composition tree with each other, interpreted through a transitive path traversal of the links.

In yet another embodiment, the processor receives a search query that specifies requested services; propagates, in response to the search query, in the DAG, the search query for the requested services; and returns a query result from the search query that was propagated in the DAG.

In another embodiment, the processor performs service discovery in the DAG using query filter criteria and selective conditions.

In yet another embodiment, the processor orchestrates services in the DAG to keep a consistency in the service composition throughout the DAG.

In still another embodiment, the processor determines a closest path connecting associated services with each other.

In still a further embodiment, the DAG G is a tuple G=(N, L, F, W) which includes:
- a finite set of vertices or nodes N,
- a finite set of vertices connecting transitions or links L,
- a set of functions F describing the general dynamic behavior of the defined graph, such as bidirectional relationship like ancestor, predecessor or adjacency matrix, and a weighting function W: L→$\mathbb{R}$ of the DAG is defined consistent with the following:
  for s sequential, p parallel, i iterative, b boolean, c a total amount of service calls, $e_{kpi}$ an empirical coefficient, and d a distance between a source node and a destination node of a traversal of a one of the service calls, $$w(l) = \sum_{source}^{destination} \frac{\left(\left(s + p + i + \frac{b}{2}\right) * c * e_{kpi}\right)}{d(\text{source, destination})}.$$

One, or a combination of more than one, or all, of the above embodiments, can be combined and provided as a single embodiment.

Another embodiment provides a method to perform a transitive traversal service discovery, according to one or more of the above embodiments.

Yet another embodiment provides a non-transitory computer-readable medium with instructions, which when executed can perform a method according to one or more of these embodiments.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 9 is java like pseudo code for a node class;

FIG. 10 is java like pseudo code for a link class;

FIG. 11A and FIG. 11B collectively are java like pseudo code for a graph class;

FIG. 12A, FIG. 12B, and FIG. 12 C collectively are java like pseudo code for a USDL service graph transitive traversal;

DETAILED DESCRIPTION

Figure 1:
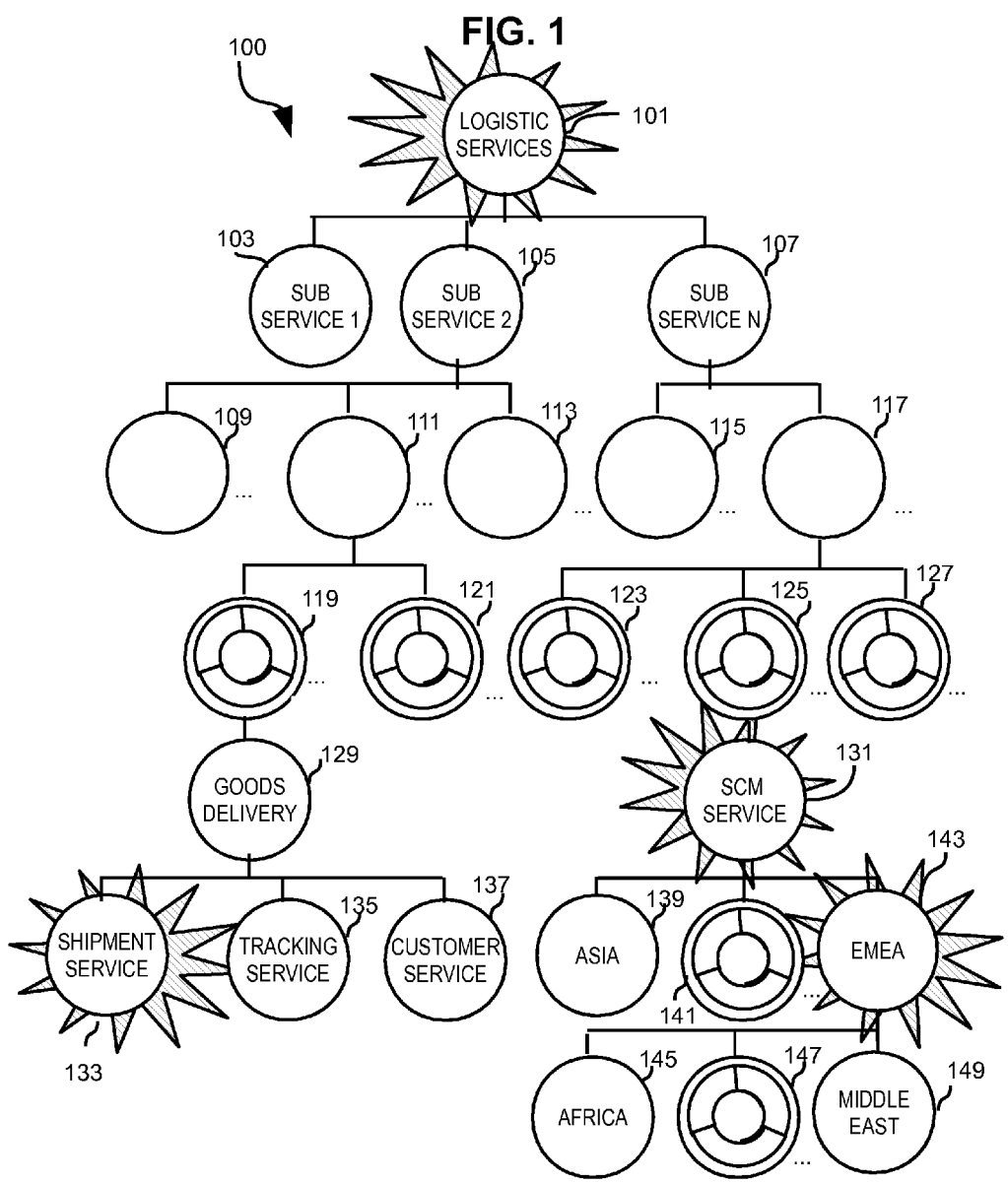
FIG. 1 is a data flow diagram illustrating a logistic scenario.

In overview, the present disclosure concerns a particular way to handle services, for example to discover services, to search for services, or the like, such as in a networked environment, some variations of which are a cloud environment, where a multitude of service offerings can benefit from some kind of structured approach, so that administration and/or runtime tasks can be executed with a favorable performance. Such services may be described in a service description language, one example of which is USDL (universal service description language), built into a hierarchical service composition tree. This tree can be translated to form a minimal weighted directed acyclic graph (DAG) which can provide an appropriate service architecture in which relations between the services are organized, to thereby allow, for example, service description, service discovery, service orchestration, search query propagation and query result fine tuning and optimization that operate within and/or on the service architecture. More particularly, various inventive concepts and principles are embodied in systems, devices, and methods therein to build a universal services life cycle core infrastructure in a larger framework, structured as a DAG, which covers the entirety of services interdependency, using tight consistency constraints, resulting in a deeper insight about the composition, nature and context of services, and promoting compatibility for further orchestration of services.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions.

It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or integrated circuits (ICs), such as a digital signal processor and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

In overview, one or more embodiments can, among other things, provide a solution, which is a framework for real world services, in the way that they are envisaged to work together. Elementary services can be accommodated as well as composite and bundled services. As a result of embodiments, the service landscape is well organized so that administration and runtime tasks can be executed with advantageous performance.

Further in accordance with exemplary embodiments, there is provided a minimal weighted directed acyclic graph (DAG) for organizing the services and their access by others. This can improve widely the manageability of various tasks that operate with a given service architecture.

1 Introduction 1.1 Service Description

In this document, a universal service description language (USDL) will be taken as an example of a suitable service description language to describe any kind of services, for example within the context of the Internet of Things according to the conditions illustrated herein. Moreover, through this description, we will highlight special service features dealing with service discovery and orchestration that are both distinctive activities in the service life cycle.

Figure 2:
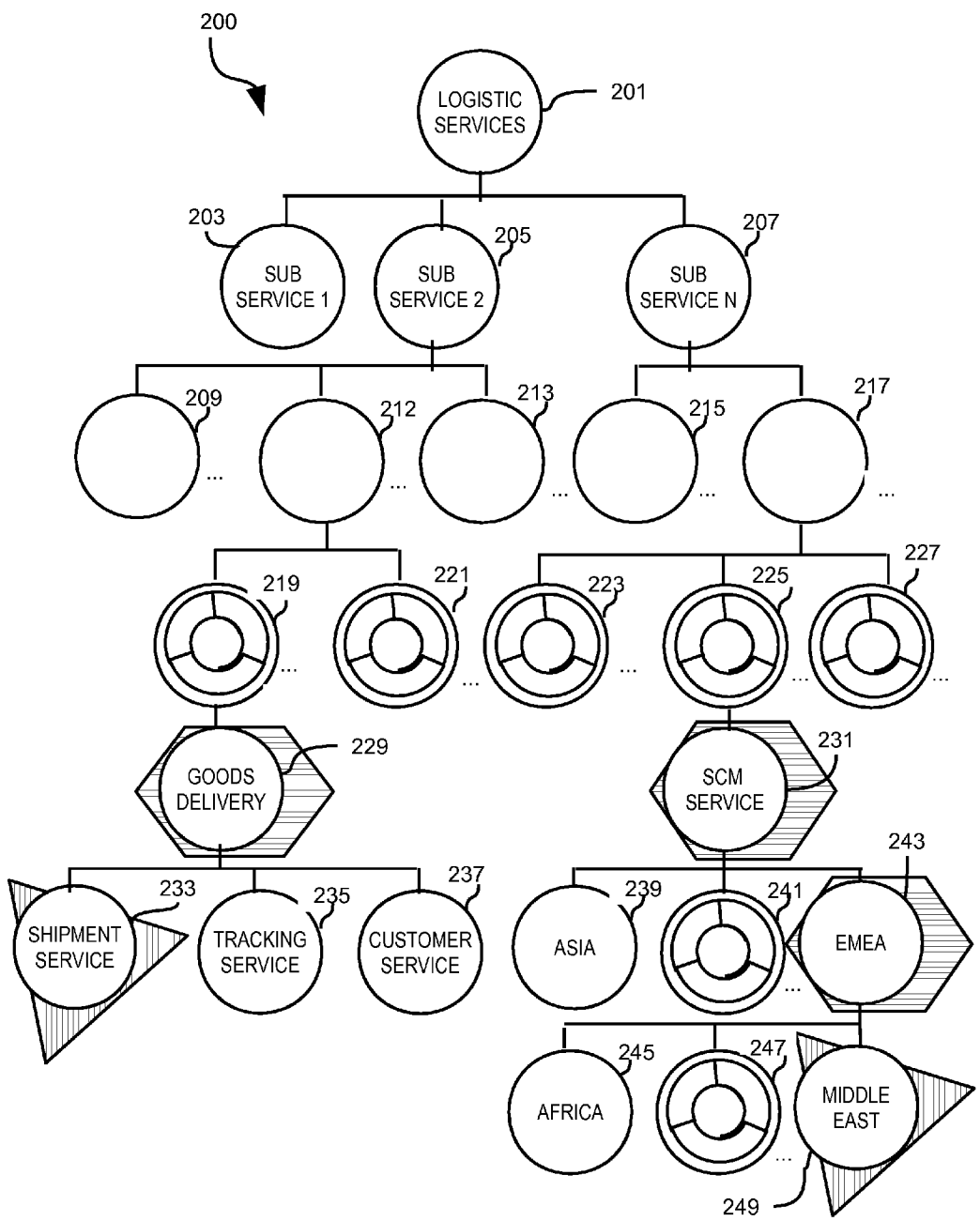
FIG. 2 is a data flow diagram illustrating a search in the tree of FIG. 1, resulting in What You Think Is Not What You Get.
Figure 3:
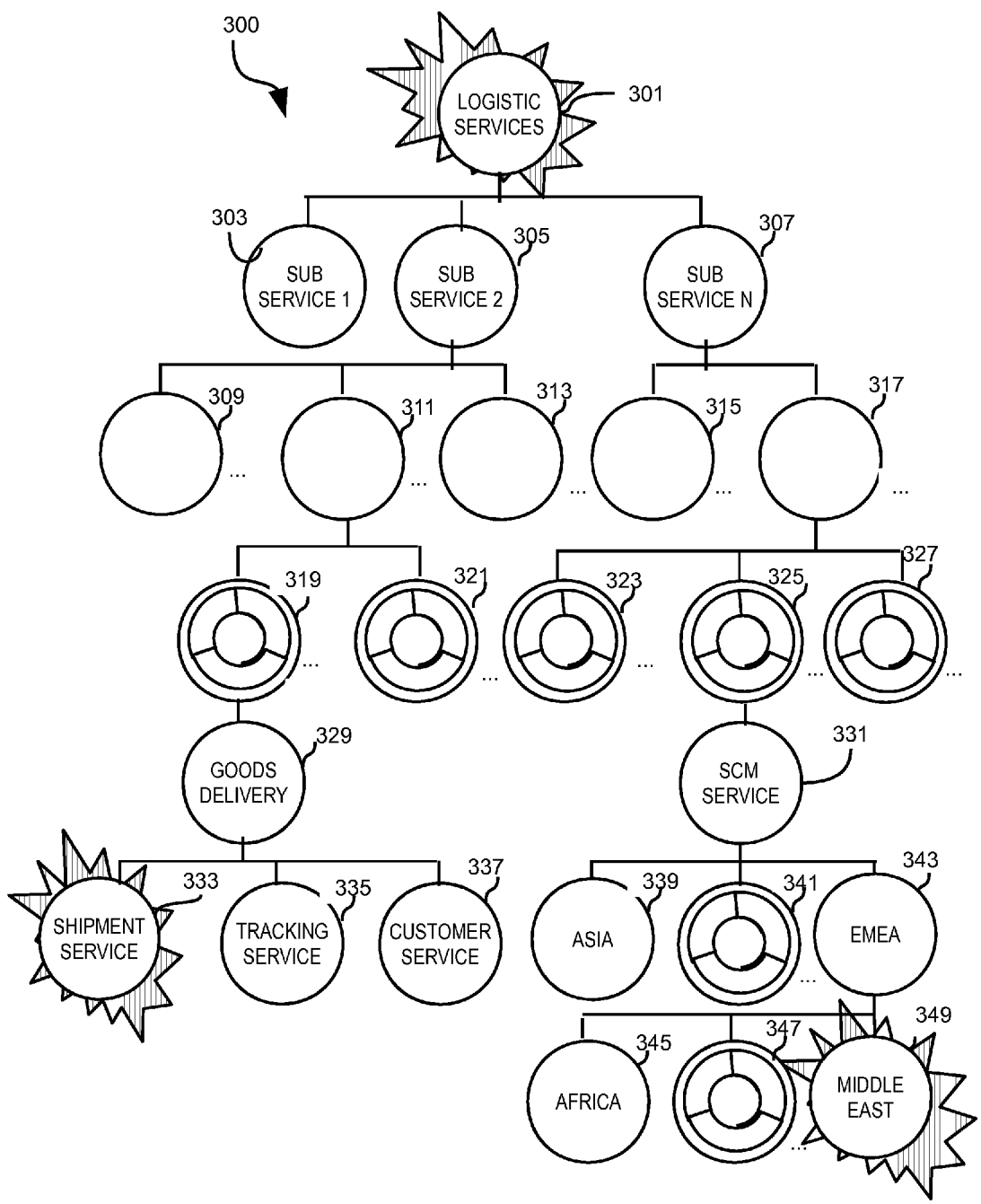
FIG. 3 is a data flow diagram illustrating a search in the tree of FIG. 1, resulting in a What You Think Is What You Get.
Figure 8:
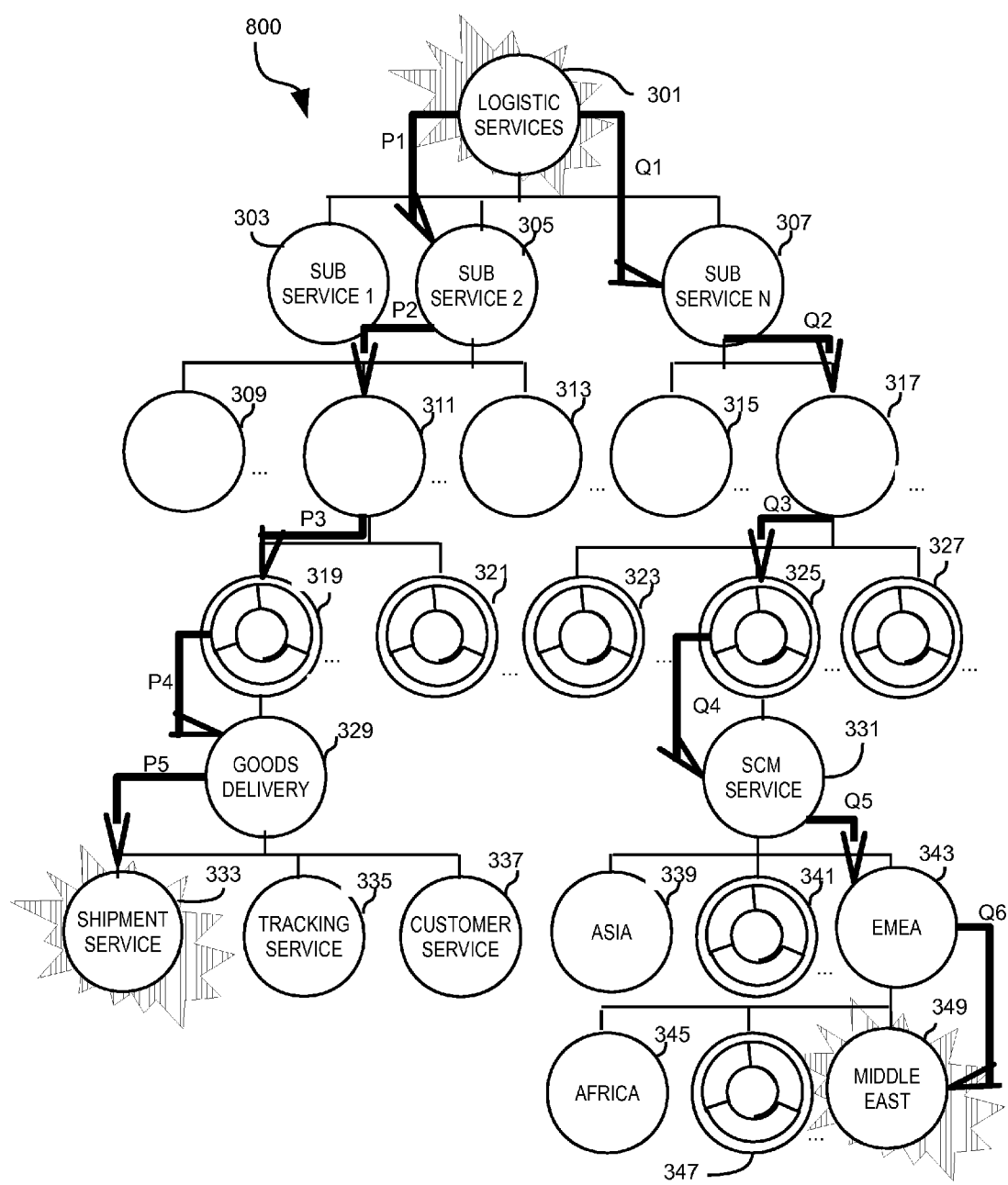
FIG. 8 is a data flow diagram illustrating a search in the tree of FIG. 3, resulting in a What You Think Is What You Get extended with identification of closest path connecting involved services with each other.

FIG. 1, FIG. 2, FIG. 3 and FIG. 8 all illustrate generally the same hierarchy service composition tree (for discussion purposes), in which FIG. 1 overviews an example logistic scenario and some basic premises, FIG. 2 illustrates how a search can result in What You Think Is Not What You Get; FIG. 3 illustrates how a search can result in What You Think Is What You Get, and FIG. 8 illustrates a modification in which a search can result in What You Think Is What You Get extended with identification of a closest path connecting involved services with each other.

1.2 Introductory Use Case

Given for example some services from a common logistic scenario, including elementary services for goods shipment all over the world and other services for supply chain management (SCM) for the Europe-Middle East-Asia (EMEA) area, as well as a composite service on a higher level combining the two previous ones at some lower level, such as highlighted by the starburst with a metaphoric touch in FIG. 1. It should be noted that the use case provides a simplified but representative example. Actual implementations can be more complicated, and/or can involve different services that are provided in this example.

Referring now to FIG. 1, a data flow diagram illustrating a logistic scenario will be discussed and described. In FIG. 1, a hierarchical tree 100 includes services and subservices 101, 103, 105, 107, 109, 111, 113, 115, 117, 129, 131, 133, 135, 137, 143. The hierarchical tree 100 also notes that services, e.g., an SCM service 131 have other details such as geographic areas represented herein by nodes indicating Asia 139, EMEA 143, Africa 145, and Middle East 149. A search initiated by a search request at an upper level in the hierarchy tree 100, such as at the logistics services 101, can propagate using usual techniques to searches 119, 121, 123, 125, 127, 141, 147 at lower levels in the hierarchy tree 100. Some of the searches 119, 125, 141 may provide results relevant to the search request.

In this example hierarchical tree 100, the shipment service 133 (highlighted with the starburst) is an elementary service; a composite service, sometimes referred to herein as a "service composition" includes the SCM service 131 for the EMEA 143 geographic area. There are other service compositions included in the hierarchical tree 100, as will be appreciated, but this example is sufficient to illuminate the discussion.

Referring now to FIG. 2, a data flow diagram illustrating a search in the tree of FIG. 1, resulting in What You Think Is Not What You Get, will be discussed and described. In FIG. 2, a hierarchical tree 200 includes services and subservices 201, 203, 205, 207, 209, 211, 213, 215, 217, 229, 231, 233, 235, 237, 243. The hierarchical tree 200 also notes that services, e.g., an SCM service 231 have other details such as geographic areas represented herein by nodes indicating Asia 239, EMEA 243, Africa 245, and Middle East 249. A search initiated by a search request at an upper level in the hierarchy tree 200, such as at the logistics services 201, can propagate using usual techniques to searches 219, 221, 223, 225, 227, 241, 247 at lower levels in the hierarchy tree 200. Some of the searches 219, 225, 241 may provide results relevant to the search request.

A simple request to search for corresponding services for supply management of goods shipment to the Middle East within a canonical search process (not using the framework discussed in subsequent sections) will resolve at most to a set of two services hitting on one side the shipment service 233, and on the other side hitting, via the SCM, the Middle East region 249, both highlighted with the shaded triangles in FIG. 2. This ignores the most suitable service composition which consists of SCM service 231 and EMEA geographic region 243.

Even further conventional optimization attempts are a cumbersome challenge when trying to statically tag one or more of the composition trees with a further spread of convenient keywords. This gradually cumulative patchwork is however a critical endeavor, because the permanent increasing data overhead could enhance the number of hits indeed, the way it is illustrated in FIG. 2 as showcased by the highlighted triangles and hexagons for the goods delivery 229, shipment service 233, SCM service 231, EMEA region 243, and Middle East region 249. Nevertheless, at the same time, it tends to have the awkward side effect of mystifying the end result by providing some secondary irrelevant services which happen to have been tagged with those keywords, which further suggest that supplemental investigation and time consuming investment for request fine tuning is necessary/desirable to avoid as much as possible returning such fake results which are uninvolved services and to reduce the impact of such fake results.

Taking a look at a composition tree, we intuitively project the corresponding mind map on a suitable graph, conserving the links that already associate the services with each other, i.e., in FIG. 2, ignoring the services at a top of a composition service, here, goods delivery service 229, SCM service 231, and EMEA region 243, all highlighted with a hexagon in FIG. 2. Thus a discovery process is intended to interpret, through a transitive path, traversal of the associating links resulting in a satisfying achievement for the end user, committing this way to the motto of "what you think is what you get", such as illustrated in FIG. 3.

Referring now to FIG. 3, a data flow diagram illustrating a search in the tree of FIG. 1, resulting in a What You Think Is What You Get will be discussed and described. In FIG. 3, a hierarchical tree 300 includes services and subservices 301, 303, 305, 307, 309, 311, 313, 315, 317, 329, 331, 333, 335, 337, 343. The hierarchical tree 300 also notes that services, e.g., an SCM service 331 have other details such as geographic areas represented herein by nodes indicating Asia 339, EMEA 343, Africa 345, and Middle East 349. A search initiated by a search request at an upper level in the hierarchy tree 300, such as at the logistics services 301, can propagate in accordance with usual techniques to searches 319, 321, 323, 325, 327, 341, 347 at lower levels in the hierarchy tree 300. Some of the propagated searches 319, 325, 341 may provide results relevant to the search request. In this example, the desired "what you think is what you get" results of a search results for shipment services to the Middle East, are the shipment service 333 and the composition service of Middle East 349 via the SCM service 131.

Nevertheless, the conventional techniques neither explicitly nor implicitly address the service discovery issue at all. The discussion herein is a snapshot to introduce the whole approach which will be well understood from this discussion. This use case and more advanced subject matters related to this approach are described further in section 3.1 below, in connection with FIG. 8.

1.3 Service Discovery

Service discovery is, strictly speaking, a little bit different from its common counterpart service search despite their mutual intermix, and they tend to be treated as interchangeable synonyms. Searching in general is a quite critical endeavor and can be difficult, despite all the optimistic expectations. Considering a not atypical six-figure hit rate, query result amounts can end with a frustrating challenge of data overload.

Discovery, however, targets search optimization through query filter criteria combined with selective conditions. Even this profiled way of matchmaking may not be enough to reduce the impact of the data overflow and the quasi virtual pollution affecting search results. Discovery is to be featured from a kind of infrastructural service awareness emphasizing the following features:

Collaboration: the internet is an interdisciplinary interaction platform where intermediate expertise promotes a continuous convergence of the search for the suitable information. From this property the two following quality predicates can be derived:
(1) Relevance: the information content has to be complete and sufficient in a mathematical sense
(2) Quality: the information is expected to commit to the desired message without ambiguity Timeliness: information is dynamic in nature and is subject to a permanent change flow that should be communicated as promptly as possible to the target audience Continuity: the information dynamic is a combined consequence from innovation and evolution increasing the value rate of its proper content.

These features highly depend on the cooperation level and alignment of the involved stakeholders to share their own expertise within the same USDL benchmark, promoting this way together the whole service life cycle in an agile and iterative way on one hand and on the other way to enhance the matchmaking activities within a service oriented eco system through an extension that will be explained later in this paper in more detail.

1.4 Service Orchestration

Service orchestration may be a key issue in the service life cycle. It also can be highly influenced from the characteristics just mentioned above. In addition there may be further factors to take into account in order to be able to orchestrate services in a suitable but above all correct manner to keep the composition consistent. Even these supplements will be covered appropriately with the same intended extension for our example of USDL that offers different kinds of composition described later in this paper.

2. Overview

Within the wide context of the Internet of Things, the service definition goes far beyond the already established technical classification. USDL uses known techniques to cover many relevant issues of the non-technical behavior of services such as legal, pricing, participants and service level to mention a few. Moreover, services can be arbitrarily combined with each other to create more complex service structures without any kind of prior compatibility check or consistency proof or previous validation.

2.1 USDL Service

Services in USDL can be distinguished in the following three types:

Elementary
Composite
Bundle

A composite type of service is a collection of services concentrating on the intermediary data exchange between the services, and the composition is bound to rules constraining pre- and post-conditions and correct behavior of overall execution. A bundle type of service is a simple and unconditional collection of services. An elementary type of service is an atomic and irreducible entity, e.g., it has no child services; in the hierarchical tree, elementary services are represented by leaves.

Figure 4:
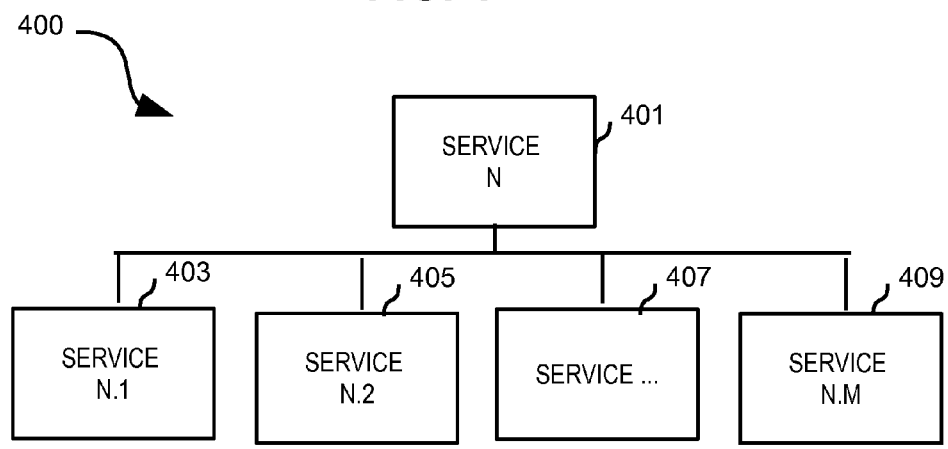
FIG. 4 is a block diagram of a USDL Service 1 (.st level) composition tree.

A service structure can be graphically translated in a hierarchical tree as illustrated in FIG. 4, specifying the relationship of all the services with each other. Referring now to FIG. 4, a block diagram of a USDL Service 1 (.st level) composition tree 400 will be discussed and described. In FIG. 4, the Service 1 composition tree 400 includes, at a top level, service n 401 represented by a node; and child nodes of service N 401, here represented by service n.1, service n.2, service . . . and service n.m 403, 405, 407, 409.

2.1.1 Formal Service Definition

Services can be defined axiomatically through the following structural recursive induction, where service call means the execution within an appropriate context of a public accessible unified interface operation:

The empty service $\emptyset_s$ is a service

Any atomic service is a service

For a service S the following single aggregation; i.e. service singleton is also a service:

{S}

For a Boolean condition C and services $S_1$ and $S_2$ the following conditioned service call is also a service:

if C then $S_1$ else $S_2$; where the else part is optional

For a logical loop predicate P and service S the following iterative service call is also a service:

while P do S

For two services $S_1$ and $S_2$ the following sequential service call is also a service:

$S_1 \wedge S_2$

For two services $S_1$ and $S_2$ the following parallel service call is also a service:

$S_1 \| S_2$

For two services $S_1$ and $S_2$ the following service bundling is also a service:

$S_1, S_2$

A service call in general is determined through the execution of at least one appropriately published valid operation or function available. As for atomic services, these are elementary units and irreducible entities; i.e. have no underlined children in the mentioned tree above. According to the referenced graphical illustration, elementary services represent the leaves of the service tree.

A trivial kind of elementary services could be ones containing just one and only one operation for example. Less trivial services could be restful or SOAP web services described respectively with a corresponding WADL file or a WSDL pendant.

Service composition, on the other hand can be a difficult task, but control structures, that build a simple nonetheless powerful mechanism, can be used to reduce the severity impact of service composition covering a relative wide range of complex but transparent service superposition.

Take, for example, some sample services from the customer relationship management (CRM) portfolio of a mobile phone provider, structured service composition enables a suitable modeling of fundamental use cases like contract switching or special event offer management.

Assume in this example that there is a generic service component for customer contract change, briefly called $S_{switch}$ and assume that the provider supports at least two types of customers, basic and privileged ones. The provider initiates a loyalty promotion for his premium customers called "expense airbag," enabling a contract migration if the fees exceed some specific amount. This can be modeled with a charge service optimizer $S_{optimizer}$ combined with the conditional statement $C_{premium}$ such as illustrated through the following semi-formal interpretation for a conditional service composition:

Define $S_{optimizer}$ (customer, contract) as if ($C_{premium}$(customer, threshold)=(customer.isPremium and customer.fees>threshold)) is true then $S_{switch}$(customer, contract.Flatrate)

The iterative counterpart of the above use case is a suitable tool to model temporal matters. Let's suppose the above campaign is maintained to celebrate a company foundation jubilee during a certain period of time. Thus the corresponding service $S_{jubilee}$ combined with the iteration criteria $P_{period}$ can be derived from the previous one such as in the following formulation:

Define $S_{jubilee}$ (customer, duration) as

While ($P_{period}$(duration)=(duration.isNotElapsed)) is true

Do $S_{optimizer}$ (customer)

For the sake of separation of concerns, the corresponding composition framework can additionally be docked to a supplement rule engine to enable hybrid composition, where advanced logical expressions can be generated from a template matrix of various generic Boolean operations independently from the real service tasks.

2.1.2 Composite Service

The composition in this issue is targeting especially the technical aspects of a service, concentrating specifically on the intermediary data exchange between the services to be composed. This may be a critical step because the composition itself is bound to some rules dealing with the fulfillment of pre- and post-conditions as well as a correct behavior of the overall execution reducing at least the total impact of possible side effects to an acceptable minimal value such as prescribed from a corresponding SLA for example.

2.1.3 Bundled Service

Compared to the preceding issue, bundling services is by far less complicated than the technical composition, because it is just a kind of a simple and unconditional collection of services. However there are in this case also few aspects to take into account corresponding to a consistent chain of bundling.

3. Service Topology

Figure 5:
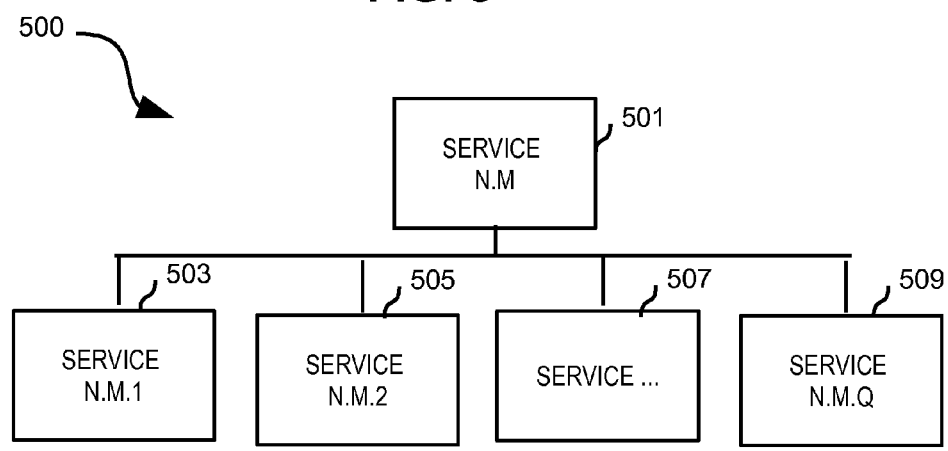
FIG. 5 is a block diagram of a USDL Service n (.th level) composition tree.

As already specified in the previous paragraphs, services defined in USDL can graphically be illustrated through a service tree such as shown in FIG. 5, and it is understood that each node is a service defined in USDL. For the sake of service discovery as well as service orchestration, only the conventional canonical keyword search strategies as well as additional semantic approaches through similarity matrices have been applied till now.

Referring now to FIG. 5, a block diagram of a USDL Service n (.th level) composition tree will be discussed and described. In FIG. 5, the Service n composition tree 500 includes, at a top level, service n.m 501 represented by a node; and child nodes of service n.m 501, here represented by service n.m.1, service n.m.2, service . . . and service n.m.q 503, 505, 507, 509.

Anyway, the derivate parental or childhood relationship from this special USDL service graph is not involved at all in conventional techniques. Nevertheless, the parental/childhood relationship between service can provide a valuable contribution for search result enhancements and service orchestration consistency. Hence there were until now no known prior attempts to address this issue, by casting the service interrelationship within USDL with a formal mathematical graph.

3.1 Service Static Graph

Figure 6:
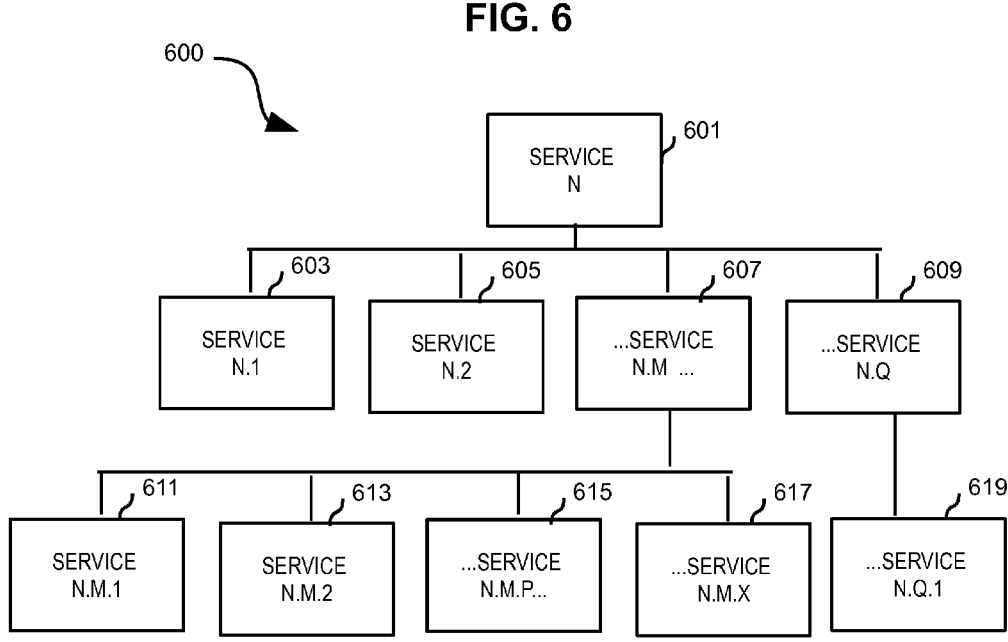
FIG. 6 is a diagram of a service directed acyclic minimal graph summarizing composition trees.
Figure 7:
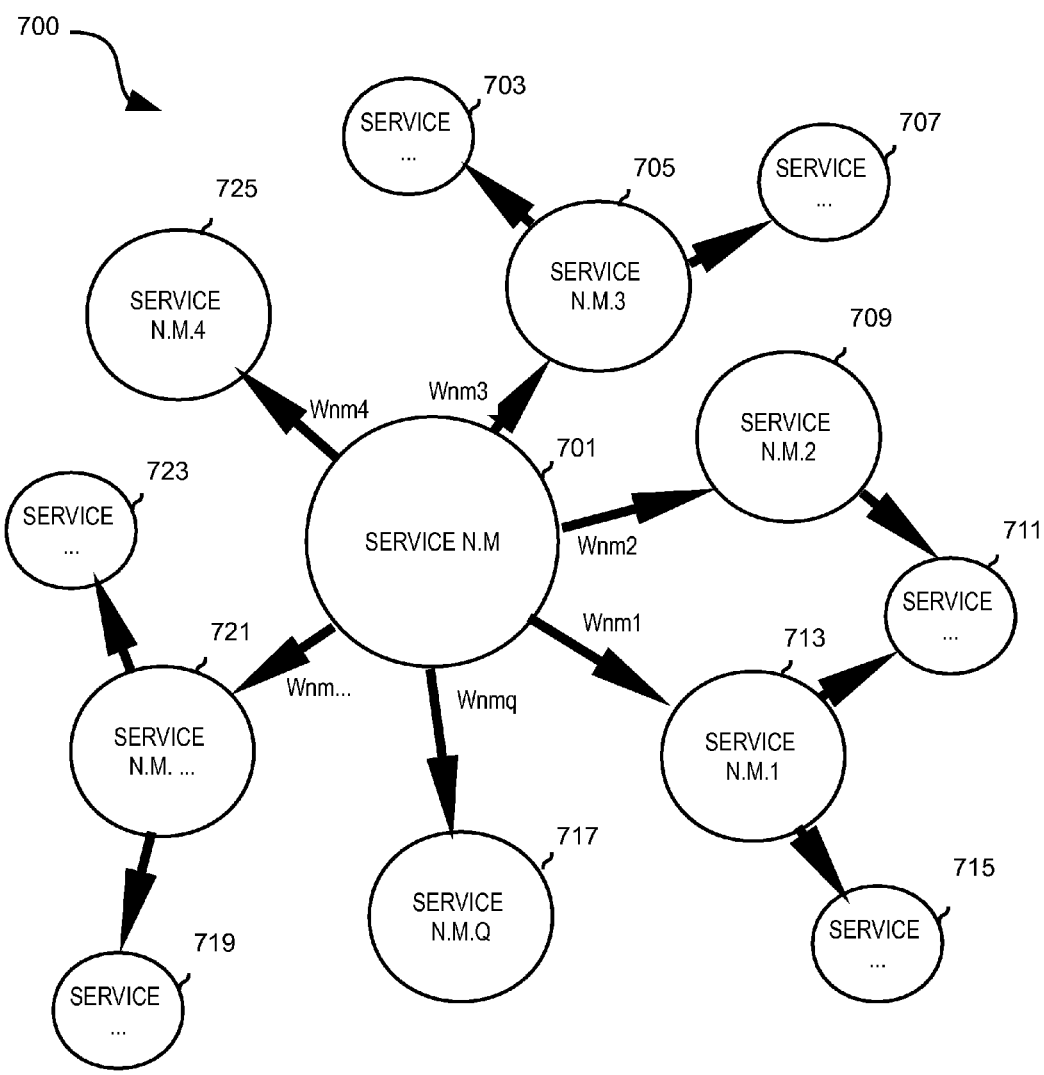
FIG. 7 is a general service graph.

This USDL service composition tree can be mapped to a directed acyclic redundancy free graph, just as illustrated in FIG. 6 or in general in FIG. 7, building this way a topology of service intermediary dependence. The graph direction is prescribed from the tree structure of the USDL service interdependency. The nodes in the trees of FIG. 6 or graph of FIG. 7 incorporate the known USDL structure, with additional structure superimposed thereon.

Referring now to FIG. 6, a diagram of a directed acyclic graph (DAG) which is minimal and that summarizes composition trees will be discussed and described. The DAG of FIG. 6 is intended to be represented of a DAG with any number of services, represented by nodes in the tree. In FIG. 6, the DAG includes, at a top level, service n 601; child nodes of service n 601, here represented by service n.1, service n.2, service n.m and service n.q 603, 605, 607, 609; and child nodes of service n.m 607, here represented by service n.m.1, service n.m.2, service n.m.p, service n.m.n and service n.q.1 611, 613, 615, 617, 619.

Referring now to FIG. 7, a general service graph 700 will be discussed and described. In FIG. 7, the graph 700 includes, at a top level, service n.m 701; child nodes of service n.m 701, here represented by service n.m.1, service n.m.2, service n.m.3, service n.m.4, service n.m. . . . and service n.m.q 713, 709, 705, 725, 721, 717; and child nodes of those child nodes, here represented by service . . . 703, 707, 711, 715, 719, 723. In FIG. 7, the direction of flow in the DAG is illustrated by heavy arrows from parent to child. It will be noted that the graph 700 is directed and acyclic. It will also be noted that the graph 700 is redundancy-free, i.e., a single service is not represented by more than one node, for example, service . . . 711 which is a child of both service n.m.1 and service n.m.2 709, 713 is represented by a single node.

It will be understood by one of skill how to reduce a tree or graph to a practical implementation.

The acyclic predicate is to be interpreted as a service integrity constraint allowing the prevention from technical service call dead locks or equivalent service trap bundling, which may be able to be easy to identify in a restricted but not in a wide scope.

A known method has been suggested in a conventional system as stated in Open Service Network Analysis. The approach presented there instead targets post processing cost optimization evaluation for service consuming from different service networks. These service networks are mapped to a corresponding commonly cyclic hyper graph of stakeholders consuming services at particular time points called Open Semantic Service Networks (OSSN) following a restrictive behavior through reducing intermediate composites to a compliant set of services.

In contrast to OSSN, which operates rather on a macroscopic level of server networks, the graph herein, which operates on a microscopic services context, is a weighted and pure acyclic directed graph focusing strictly on services to build an elementary and consistent core services infrastructure from the start on. This DAG can increase over time to cover the whole related services interdependency and can serve as associative memory for trees, such as illustrated in the logistic use case already introduced above in section 1.2, FIG. 1 to FIG. 3.

Technically speaking, the corresponding request for the search described there, but using the DAG discussed in this section, with the set of keywords "Shipment" and "Middle East," for example will at most give two different results, just related respectively to the elementary services, which are independent from each other and shown as having nothing in common.

Even blowing up the composition tree itself with additional tags overhead is neither effective nor realistic taking primarily into account that the composed services will not involve all the specific details of their hierarchically sub-ordered composites.

But due to the graph introduced here, there will be in particular a suitable hit with the highest quote accentuating at the same time not only the two services related respectively to the given keywords but also as the composite service pointing to the former ones, reflecting this way someone's intuitive premise. Moreover, this result is also already optimized because the transitive closures derived using known techniques from the graph topology can allow the identification of the closest path connecting the involved services with each other such as illustrated in FIG. 8.

Referring now to FIG. 8, a data flow diagram illustrating a search in the tree of FIG. 3, resulting in a What You Think Is What You Get extended with identification of closest path connecting involved services with each other will be discussed and described. In FIG. 8, a hierarchical tree 800 includes services and subservices, with reference numbers the same as discussed in connection with FIG. 3 to indicate the same parts.

On the hierarchical tree 800 are superimposed heavy lines indicating service path P (comprising paths P1, P2, P3, P4 and P5) and service path Q (comprising paths Q1, Q2, Q3, Q4, Q5 and Q6). These paths provide an infrastructure represented by the DAG further discussed herein.

The infrastructure represented by the superimposed heavy lines can be the fundament of the global services life cycle enabling a priori, with its topological structure, a fast retrieval for various purposes. In addition, its consistency precondition allows a non-ambiguous service composition.

This infrastructure can also include also ontological aspects featuring a semantic driven service discovery. It can enable, moreover, the construction of a powerful adjacency matrix, from the graph, to serve as preprocess for a corresponding suggestion engine within a service composition framework addressing especially services compatibility and potential orchestration candidates. An adjacency matrix can be implemented from a given graph, in this case the DAG, using known techniques.

In addition, the related quantifying characteristic measures the services interdependency level, thereby allowing the localization of redundant services, for example, or unsuitable heavy calls due to badly hierarchically situated or sub ordered services that have to be optimized to enhance performance.

To avoid redundancy, the transitive cased built from service paths P, Q are kept minimal which will accelerate the graph traversal during service discovery and will allow straightforward and tuned service composition and/or bundling without any kind of needless ballast and service overhead.

3.2 Service Graph Dynamic Behavior

This graph can be generated, for example within a big memory benchmark, and can be maintained, for example in a cached recommendation engine, for example, for auto complete and/or serving various suggestions in a matchmaking session or even giving a preliminary impact analysis for a pending change request.

In any case this graph allows a quick transitive path traversal in the DAG to locate and detect any kind of services in the tree, and to retrieve and extract any kind of information from the DAG or tree needed for some purpose. Moreover, this graph can be extended with further virtual so-called recommendation graphs to accentuate potential orchestration candidates and/or even domain specific ones, when correspondingly projected on the graph.

3.3 Service Graph Implementation

For the sake of a proof of concept of the introduced issue above, the following simplified formulas and java like pseudo code parts describe in general a concrete elaboration of the graph construction, use and traversal. For the graph construction we use generic containers illustrated through the parametric class templates listed below and illustrated in FIG. 9, FIG. 10, FIG. 11A-B, and FIG. 12A-C, without taking the traditional plain old java object (POJO)'s setters and getters into account. These illustrates are intended to be trivial but representative for this example, and can be adapted as appropriate.

Mathematically speaking a graph G is a tuple G=(N, L, F, W) consisting of:
a finite set of vertices or nodes N
a finite set of vertices connecting transitions or links L
a set of functions F describing the general dynamic behavior of the defined graph, such as bidirectional relationship like ancestor, predecessor or adjacency matrix
a weighting function W: L→$\mathbb{R}$ defined as
for s sequential, p parallel, i iterative, b boolean, c the total amount of service calls, $e_{kpi}$ an empirical coefficient and d the distance between source and destination node $$w(l) = \sum_{source}^{destination} \frac{\left(\left(s+p+i+\frac{b}{2}\right)*c*e_{kpi}\right)}{d(source, destination)}$$

The empirical coefficient $e_{kpi}$ is a unit, initially set to 1, that reflects the quality of the calls derived from specific KPI alias Key Performance Indicators related to reputation, response time or SLA-Commitment, etc. It can have a touch of a correctness behavior, using conventional techniques, to tune up the weight to a close-to-realistic value.

The graph navigation otherwise can be interpreted as asymmetric transitive closures $$ATC = \overset{*}{\rightarrow}$$

traversing the nodes using suitable combinations of ancestors and successors function utilities or equivalent techniques through links and related paths as stated below. The distance is thus the count of links between the two related nodes or services within the transitive closure.

Initially the weights for each of the links are all set to zero. The weighting can be reflective of service calls relative to the link, as further explained. The graph weighting feature can enable the extraction of special rules like the expression of redundant service calls where the weight of a special link at a certain measuring point is zero or does not exceed a predefined empirical threshold after a particular number of superordinate service calls.

3.3.1 Nodes

The nodes can be compiled to a generic class. FIG. 9 illustrates an example of a java like pseudo code for a node class. A node class in this example can include an "item" which is an object representing a node (in this example, a USDL service), and a successor object related to the current item, i.e., a current node and its next node.

3.3.2 Links

The links can be decoded to a generic couple of nodes as illustrated in FIG. 10, defining the direction characteristic of the graph. FIG. 10 illustrates an example of a java like pseudo code for a link class, which indicates the parent item (source), child item (destination), and a link.

3.3.3 Graph

The graph can be converted to a generic container with some utility functions, as illustrated in FIG. 11A-FIG. 11B. FIG. 11A and FIG. 11B collectively illustrate a java like pseudo code for a graph class. In this example, the graph is populated with the corresponding nodes and vertices propagated from the root. Then, a primitive recursive graph topology construction method, for example, can be used, to address parents, ancestors, children, and successors.

The graph traversal can be described generally through the application of appropriate recursive functions due to the parental and/or childhood relationship between the vertices with each other. Moreover, further utility functions can be implemented to enhance and simplify the usage and treatment of the graph and its sub-ordered components or for reverse transition also, if it is more time saving for example, or for graph direction enforcement, as well as other helpful checks such as for leaves and the like.

3.3.4 USDL Service Graph Transitive Traversal

As already stated in the previous sections, the USDL services network (which can be expressed as a hierarchical tree or trees) can be mapped on the weighted directed acyclic graph discussed above in order to apply many graph specific navigation best practices and approved techniques for various service utilities. More specifically, service discovery might be the most particular topic in this context, especially when it comes to adding value to the classical search through a complementary semantic enhancement.

A suitable service ontology can be derived from the service network topology and its related discrete transitive closures within USDL, applying associations like has_parent, has_child, has_ancestor, has_predecessor, is_adjacent_bundled_with, is_adjacent_composed_with, is_intermediary_composed_with and similar relations.

Thus a conform recommendation engine can be established and accordingly populated with an ontology based service landscape serving, however, this way the semantic behavior of a service discovery engine. This feature enables the improvement of search result, providing additional information to the found services with context sensitive data about nature, composition state as well as related services with a defined degree of similarity, for example. Some of these discussed issues will be translated to the pseudo code illustrated for example in FIG. 12A to FIG. 12C.

Referring now to FIG. 12A, FIG. 12B, and FIG. 12 C collectively, a java like pseudo code for a USDL service graph transitive traversal will be discussed and described. In this example, the service graph is instantiated; the service parents are specified to provide deeper information about its composition or bundling contribution; the service children are specified to give further details about its composition or bundling state; the bundled adjacent services of a service are specified to give deeper insight about its bundling content; and the composita adjacent services of a service can be specified, which gives deeper insight about its composition nature.

The utility functions listed above can be combined as desired to provide the search result with the convenient information needed in a global context as well as in a private scope where the result items can be configured individually to focus on a specific result profile.

4 Synopsis

Mapping the USDL service composition tree to an equivalent minimal weighted directed acyclic graph can be a highly valuable step towards an overall consistent service landscape. The term "translate" is sometimes used herein instead of "map". The designation "minimal weighted" refers to a "minimal" path considering the weight assigned to each of the links which is traversed in the path; a link in a path can be "weighted" with respect to a performance characteristics, for example, key performance indicators (KPI), for example, quality of calls for a service, reputation, response time, quantity of calls, and so on. Such a graph allows not only a bidirectional transitive traversal (sometimes referred to herein as navigation) for a fast information retrieval but also a check mechanism for a continuous and permanent service composition consistency and non-redundancy. One or more KPIs can be implemented in accordance with known techniques.

Figure 13:
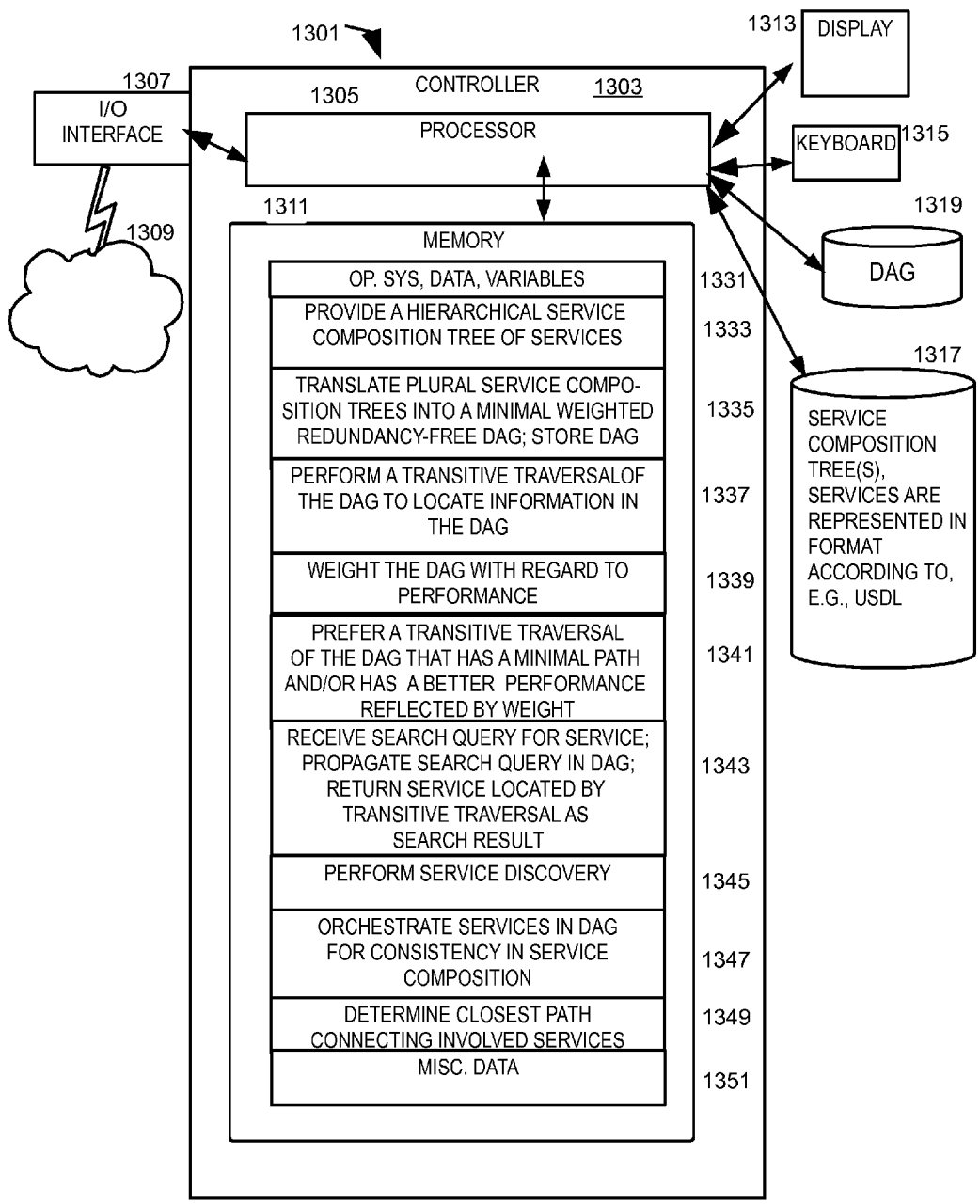
FIG. 13 is a block diagram illustrating relevant portions of a computer system.

Referring now to FIG. 13, a block diagram illustrating relevant portions of a computer system 1301 will be discussed and described. The computer system 1301 may include one or more controllers 1303, a processor 1305, an input/output (i/o) interface 1307 for communication such as with a computer network or data network 1309 (e.g., a cloud, an intranet, the internet, etc.), a memory 1311, a display 1313, and/or a user input device represented here by a keyboard 1315. Alternatively, or in addition to the keyboard 1315, a user input device may comprise one or more of various known input devices, such as a keypad or a pointing device such as a computer mouse, a touchpad, a touch screen, joy stick, a trackball, or the like. The display 1313 may present information to the user by way of a conventional liquid crystal display (LCD) or other visual display, and/or by way of a conventional audible device (e.g., a speaker) for playing out audible messages. Portions of the computer system 1301 are well understood to those of skill in this area and have been omitted to avoid obscuring the discussion.

The processor 1305 may comprise one or more microprocessors and/or one or more digital signal processors. The memory 1311 may be coupled to the processor 1305 and may comprise a read-only memory (ROM), a random-access memory (RAM), a programmable ROM (PROM), and/or an electrically erasable read-only memory (EEPROM). The memory 1311 may include multiple memory locations for storing, among other things, an operating system, data and variables 1331 for programs executed by the processor 1305; computer programs for causing the processor to operate in connection with various functions such as to provide 1333 a hierarchical service composition tree of services; translate 1335 plural trees of service composition into the DAG; perform 1337 a transitive traversal of the DAG to locate information; weight 1339 the DAG with regard to performance; prefer 1341 a transitive traversal which has a minimal path and/or better performance; receive 1343 a search query for a service and act on the search query; perform 1345 a service discovery; orchestrate 1347 services in the DAG for consistency in service composition; and determine 1349 a closest path connecting involved services as reflected in the DAG. The computer programs may be stored, for example, in ROM or PROM and may direct the processor 1305 in controlling the operation of the computer 1301. Each of these functions is considered in more detail herein, to the extent that it is not detailed elsewhere in this document. In the example of FIG. 13, the DAG is stored in an electronic storage 1319. Also, one or more tree(s) of service composition, in which the services are represented in a formal service description language (for example, USDL) can be stored in one or more electronic storages 1317.

The user may invoke functions accessible through the user input device represented here by the keyboard 1315; the keyboard 1315 may be supplemented or replaced with a scanner, card reader, or other data input device. Responsive to manual signaling from the user input device represented by the keyboard 1315, in accordance with instructions stored in memory 1311, and/or automatically upon receipt of certain information via the i/o interface 1307, the processor 1305 may direct the execution of the stored programs.

The processor 1305 may be programmed to provide 1333 a hierarchical service composition tree of services. One or more trees of service composition of services can be constructed, for example, using known techniques. The service can be represented in the tree using a formal service description language, for example, using known techniques, such as in connection with USDL. The trees which have been constructed may be stored, for example, in tree storage 1317, for later retrieval and re-use. Plural hierarchical trees may be constructed, and added to from time-to-time. Plural hierarchical trees can be provided, for example by accessing the tree storage 1317, or by creating such a hierarchical tree.

The processor 1305 may be programmed to translate 1335 (that is, map) plural trees of service composition into the DAG, which can be a minimal, weighted, redundancy-free DAG. The DAG which is thereby created or updated can be stored, for example into an electronic storage 1319. As discussed herein, the DAG represents relationships between the services of the trees of service composition of services. Techniques may be used for extracting desired data from the plural trees of service composition of services, utilizing the known formal service language which specifies desired fields from which to extract content and desired fields in the DAG into which to store extracted content. Internal details of a service in the hierarchical tree can be omitted from the DAG, for example fields which do not indicate a constraint to a relationship to another service. The services represented by the DAG can be stored as nodes, and links in the DAG between nodes can indicate directional relationships between services. This has been discussed in detail elsewhere herein.

The processor 1305 may be programmed to perform 1337 a transitive traversal of the DAG to locate information in a node or nodes of the DAG; additional details regarding the located service can be located, for example, in the tree(s) of service composition 1317, based on the located node(s) of the DAG. A transitive traversal has been discussed elsewhere herein in more detail.

The processor 1305 may be programmed to weight 1339 the DAG with regard to performance. A link in the DAG between services can be assigned a weight, for example, to represent performance quality/quantity or other performance indicia. The performance can be weighted according to the usual techniques, and the weight can be assigned to the link. In this way, a more or less desirable link can be selected for a traversal.

The processor 1305 may be programmed to prefer 1341 a transitive traversal of the DAG, for example, using graph transitive closure techniques, which has a minimal path and/or better performance. A shortest path from an origin node to a destination node may be selected, keeping in mind that the path may be weighted with respect to performance so that a more highly weighted path which indicates worse performance can be avoided in favor of a path that indicates a relatively better performance. Weights can be determined for the entire path and/or for portions of the path.

The processor 1305 may be programmed to receive 1343 a search query for a service and act on the search query by propagating a search query in the DAG, and to return, as the search result, a service located via transitive traversal of the DAG. For example, a request may be received, such as from a user, that specifies a desired service and characteristics of the desired service. A search for a service is discussed elsewhere herein.

The processor 1305 may be programmed to perform 1345 a service discovery. The service discovery can be similar to the search query, although discovery can target search optimization through query filter criteria combined with selective conditions.

The processor 1305 may be programmed to orchestrate 1347 services in the DAG for consistency in service composition, as discussed elsewhere herein.

The processor 1305 may be programmed to determine 1349 a closest path connecting involved services, as reflected in the DAG.

As will be understood in this field, besides the functions discussed above, the memory 1311 can include locations for other miscellaneous data 1351 along with the usual temporary storage and other instructions for other programs not considered herein. For example, the DAG might be stored locally into the miscellaneous data 1351 storage area, and/or information retrieved from the electronic storage of the trees of service composition 1317 might be stored locally into the miscellaneous data 1351 such as while being translated/mapped into a format appropriate for the DAG.

The computer system 1301 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer system used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 1305, memory 1311, a disk drive and/or removable storage medium are referred to as "computer-readable storage media" and provide non-transitory storage of computer programs and data.

It should be understood that FIG. 13 is described in connection with logical groupings of functions or resources. One or more of these logical groupings may be performed by different components from one or more embodiments. For example, in an embodiment it is possible to omit the function to translate 1335 plural trees of service composition as well as the storage 1317 of the trees of service composition, with an assumption that the DAG has previously been prepared. Also, one or more of the search query 1343, service discovery 1345 and/or services orchestration may be omitted. As a further example, the display 1313 and/or keyboard 1315 can be omitted from a computer system 1301 which is performing an automated determination without human interaction. Similarly, the I/O interface 1307 can be omitted. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

Figure 14:
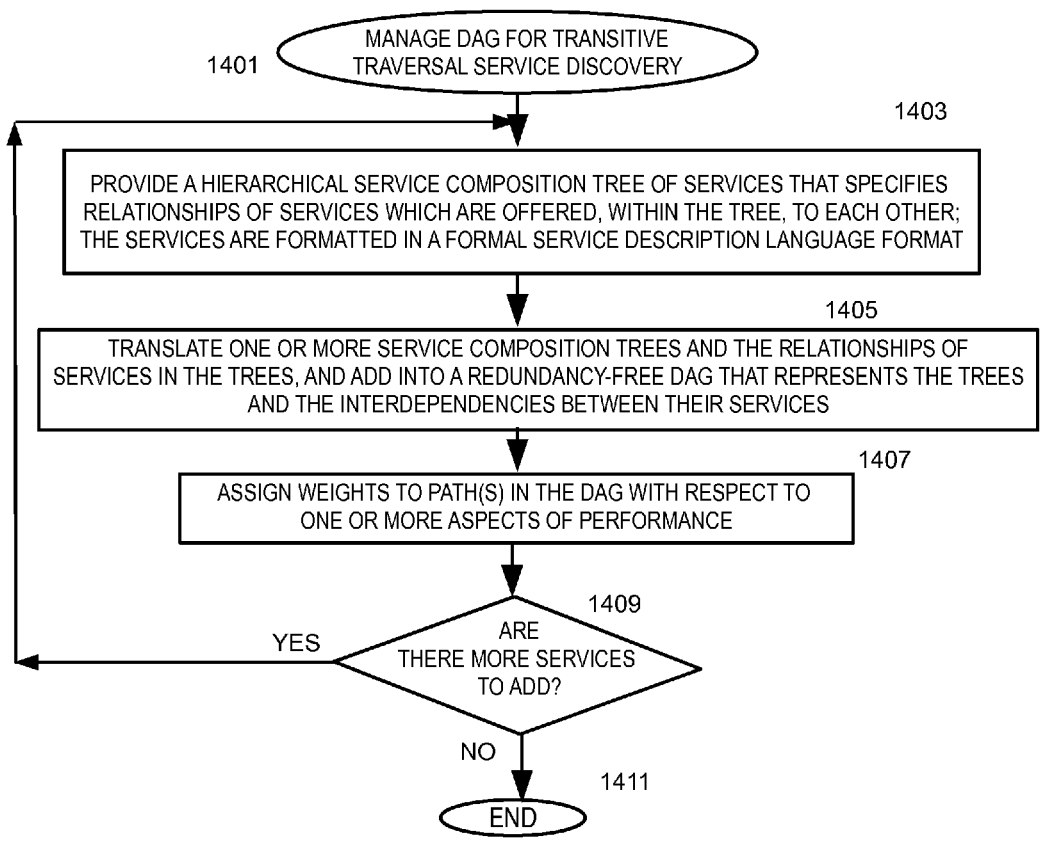
FIG. 14 is a flow chart illustrating a procedure to manage a directed acyclic graph for transitive traversal service discovery.
Figure 15:
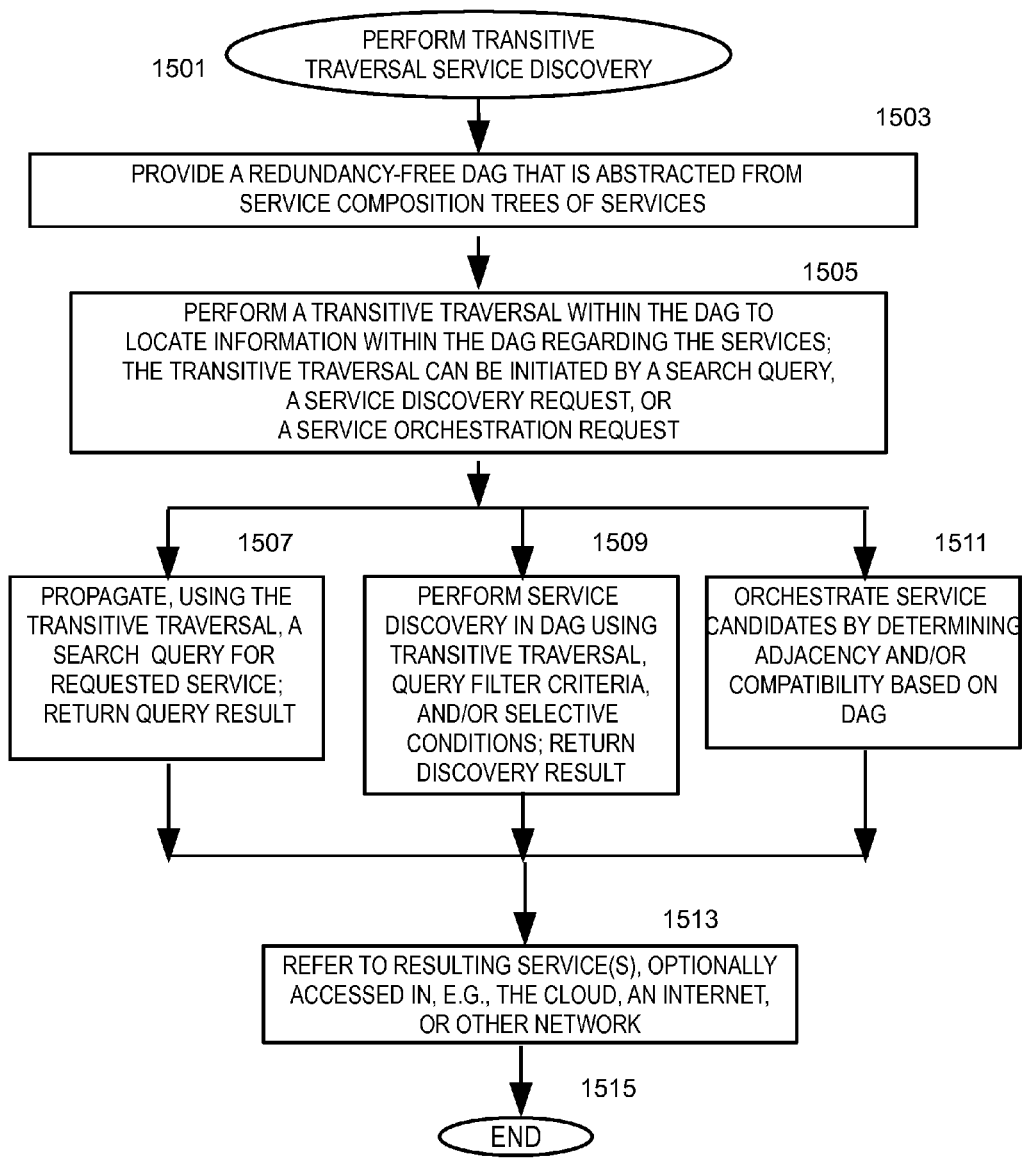
FIG. 15 is a flow chart illustrating a procedure to perform a transitive traversal service discovery.

Complementary procedures for managing a directed acyclic graphic, and for performing a transitive traversal discovery, are now discussed concretely in connection with FIG. 14 and FIG. 15, respectively. The procedures can advantageously be implemented on, for example, a processor of a controller, described in connection with FIG. 13, or other apparatus appropriately arranged. Each of these procedures will now be described in more detail, with the exception that details already discussed above may have been omitted.

Referring now to FIG. 14, a flow chart illustrating a procedure 1401 to manage a directed acyclic graph for transitive traversal service discovery will be discussed and described. By way of overview, the procedure to manage the DAG 1401 will provide 1403 a hierarchical service composition tree of services; translate 1405 the trees and their relationships into a redundancy-free DAG; (optionally) assign 1407 weights to paths in the DAG; and loop 1409 if there are more services to add. This is described in some more detail below.

The procedure 1401 will provide 1403 a hierarchical service composition tree of services, in which the hierarchical tree specifies relationships of services which are offered, within the tree, to each other. The services in the service composition tree can be formatted using known techniques in a formal service description language format, e.g., USDL. Further explanations of services are provided herein to illustrate that is not intended to arbitrarily designate, as a service, a portion of a complete service which is not offered to another party as a complete service. For example, a complete service which is offered, which is, for example, a retail sale of a product. It is not intended for this retail service to designate only a subset of the service, which is not itself offered as a complete service by this party (e.g., only the shipping of the product, which is sold).

The procedure 1401 will translate/map 1405 one or more trees of service composition and the relationships of those services in the trees, and add the relationships into a redundancy-free DAG that represents the trees and the interdependencies between their services. Optionally, the procedure 1401 will assign 1407 weights to one or more of the path(s) in the DAG with respect to one or more aspects of performance, as discussed elsewhere herein.

The procedure 1401 will determine whether 1409 there are more services to add to the DAG, for example, when services are updated/added. If there are more services to add to the DAG, the procedure will loop back to provide 1403 a hierarchical tree of the services.

Referring now to FIG. 15, a flow chart illustrating a procedure 1501 to perform a transitive traversal service discovery will be discussed and described. The procedure 1501 will provide 1503 a redundancy-free DAG representing service inter-relationships, that was previously abstracted from trees of service composition of services, for example as described above. The procedure 1501 will perform 1505 a transitive traversal within the DAG to locate information within the DAG regarding the services which are additionally represented in the hierarchical tree(s). The transitive traversal can be initiated by a search query, a service discovery request, or a service orchestration request.

The procedure 1501 can propagate 1507, using the transitive traversal, a search query for the requested service, and return the located service(s) as the query result.

The procedure 1501 can perform 1509 service discovery by using the transitive traversal of the DAG, employing query filter criteria and/or selective conditions, and can return the located service(s) as the discovery results.

The procedure 1501 can orchestrate 1511 service candidates by determining which of services meeting specified criteria are adjacent (as determined by paths) and/or which of services meeting the specified criteria are compatible, based on the DAG.

Having returned what may be regarded as a suggested service or combination of services meeting the request, the procedure 1501 optionally can refer 1513 to the resulting service(s), for example as accessed via the cloud, the Internet, a corporate intranet, and/or other computer/data networks. The procedure 1501 can then end 1515.

The detailed descriptions, which appear herein, may be presented in terms of program procedures executed on a computer or a network of computers. These procedural descriptions and representations herein are the means used by those skilled in the art to most effectively convey the substance of their work to others skilled in the art.

Further, an embodiment has been discussed in certain examples as if it is made available by a provider to a single customer with a single site. An embodiment may be used by numerous users, if preferred, and the users can be at one or more sites.

The system used in connection herewith may rely on the integration of various components including, as appropriate and/or if desired, hardware and software servers, applications software, database engines, server area networks, firewall and SSL security, production back-up systems, and/or applications interface software.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding, comparing, or matching, which are commonly associated with mental operations performed by a human operator. While the discussion herein may sometimes contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

GLOSSARY

Terms as used in this document and claims are intended to be interpreted as understood to one of skill in the all of the art in the relevant services, first within the context, of both the Internet of Services and service description languages (such as USDL); second (if not interpretable by the first interpretation) within the context of information sciences; and third (if not interpretable by the first and second interpretations) within the context of computer sciences; instead of as interpreted by a more general dictionary. One of skill in the relevant art is deemed to be skilled with the concepts covered in all of the following documents: Barros, Alistair, & Oberle, Daniel, Hrsg. (2012), *Handbook of Service Description: USDL and Its Methods*, Springer; Oberle, D., Barros, A., Kylau, U., & Heinzl, S. (2012), *A unified description language for human to automated services*, Information Systems (Juni); Dijkstra E. W., Hoare C. A. R., Dahl O.-J. (1972), *Structured Programming*, Academic Press; and Wirth N. (1982), *Programming in Modula*-2, Heidelberg: Springer-Verlag.

The above discussion refers to Unified Service Description Language (USDL) as a convenient example which is representative of a formal service description language. USDL is a formal language known in the information sciences to describe services in respect to the access of services. Current key players of the development of USDL are SAP and Telecom. USDL allows a unified description of business, operational and technical aspects of services as depicted in the figure. Technical services may be lifted to business services, but USDL also allows describing more manual or physical services. As many services have a hybrid character with both a digital and physical or manual footprint, USDL can facilitate the combination and aggregation of such services. USDL can be implemented in accordance with standards including USDL 3.0 M5, USDL 3.0 M4, USDL XG, and variations and evolutions thereof. For the reader's convenience, the following brief description of USDL is provided from the Internet of Services organization: "The Unified Service Description Language (USDL), creates a 'commercial envelope' around a service. More specifically, USDL allows a unified description of business, operational and technical aspects of services as depicted in the figure. Technical services may be lifted to business services, but USDL also allows describing more manual or physical services. As many services have a hybrid character with both, a digital and physical or manual footprint, USDL can facilitate the combination and aggregation of such services. Therefore, USDL can be considered one of the foundational technologies to set up an Internet of Services around today's core enterprise systems."

Another formal service description language is Web Services Description Language (WSDL) which is an XML-based language that is used for describing the functionality offered by a Web service. A WSDL description of a web service (also referred to as a WSDL file) provides a machine-readable description of how the service can be called, what parameters it expects, and what data structures it returns. It thus serves a roughly similar purpose as a method signature in a programming language. WSDL can be implemented in accordance with standards including WSDL 2.0, and variations and evolutions thereof.

Another formal service description language is Web Application Description Language (WADL), which is a machine-readable XML description of HTTP-based web applications (typically REST web services). WADL models the resources provided by a service and the relationships between them. WADL is intended to simplify the reuse of web services that are based on the existing HTTP architecture of the Web. It is platform and language independent and aims to promote reuse of applications beyond the basic use in a web browser.

Other formal service description languages are known, and include, for example, SOAP, SDL (Service Description Language) available from Microsoft, NASSL (Network Application Service Specification Language) available from IBM, or others.

Moreover, the discussion herein refers to a "service" or "services"; a service is regarded as a transaction, generally commercial in nature, between two different parties, where one party to the transaction has resources and grants temporary access, to those resources, to the other party to whom the service is offered, in order to perform a prescribed function and provide, to the other party, a related benefit. Resources may be one or more of human workforce and skills, technical systems, information, consumables, land and/or others. Examples of services include: a taxi service (resources are the driver, the car, the maps, the billing system, and the call center; the function and related benefit are the transportation from one point to another); a rating service which defines creditworthiness of a company (main resources are information systems and their content, there is a price scheme (flat rate or per-use), function is to receive a rating, benefit is to reduce transaction risk). Other examples of services are event management, transportation, insurance, medical services, and so on—there are many other examples.

The designation "service composition" is used to refer to a structure which is a collection of interdependent services and which is a composition of individual services, in which each of the services in the service composition is represented as its own separate structure and is not absorbed into an aggregate summary of the services; in some implementations each individual service in the service composition can be abstracted to the DAG, such that internal details of each service are omitted, for example where the omitted internal details do not delineate a relationship to another service; a service composition can be part of another (parent) service composition.

A traversal of a graph is referred to herein as "transitive" to indicate that the nodes in the graph are visited in a particular manner, in which the path which is followed has a mathematically/logically transitive relationship between every three nodes in the path that is traversed; that is, if node A is related to node B and node B is related to node C, then node A is related to node C, for all nodes A, B and C in the path, wherein the relations between nodes A and B, B and C, and A and C are all evaluated in the same context of why the path is followed.

The term "computer system" or "computer" used herein denotes a device sometimes referred to as a computer, laptop, personal computer, personal digital assistant, notebook computer, personal assignment pad, server, client, mainframe computer, or evolutions and equivalents thereof; and to a computer-processor-enabled electronic device with electronic display which employs a graphical user interface to interact with a user.

Furthermore, the computer networks or data networks of interest for communicating between computers onto which some embodiments may be distributed include those that transmit information in packets, for example, those known as packet switching networks that transmit data in the form of packets. Such computer networks or data networks can provide wireless communications capability and/or utilize wireline connections such as cable and/or a connector, or similar.

End of Glossary

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A computer system, comprising:
   a processor, the processor is configured to:
     provide a service composition tree of services which are offered, wherein the tree is hierarchical and specifies relationships of the services which are offered within the service composition tree to each other;
     translate plural trees of service composition and the relationships of the services represented in the plural trees into a directed acyclic graph (DAG) that represents the plural trees of service composition, the DAG being redundancy-free; and
     perform a transitive traversal within the DAG among the services represented in the DAG to locate information, within the DAG, regarding the services, in relation to each other; and
   an electronic storage cooperatively operable with the processor, and configured to store the DAG,
   wherein a service composition is a collection of interdependent services, each of the services in the service composition is represented as its own separate structure which is separate from other services in the service composition,
   wherein links in the DAG are weighted with regard to performance characteristics of the services.

2. The computer system of claim 1, wherein
   the services which are in the service composition tree are formatted according to a service description language format, and data of the services contained in the service description language format in the service composition tree are translated into the DAG, and
   a direction among nodes representing services within the DAG is prescribed from interdependencies of the services which are determined from the plural trees of service composition.

3. The computer system of claim 1, wherein the DAG is further structured to conserve links that already associate services represented by nodes in the service composition tree with each other, interpreted through a transitive path traversal of the links.

4. The computer system of claim 1, wherein the processor is further configured to
   receive a search query that specifies a requested service;
   propagate, in response to the search query, in the DAG, the search query for the requested service; and
   return a query result from the search query that was propagated in the DAG.

5. The computer system of claim 1, wherein the processor is further configured to
   perform service discovery in the DAG using query filter criteria and selective conditions.

6. The computer system of claim 1, wherein the processor is further configured to
   orchestrate services in the DAG to keep a consistency in a service composition throughout the DAG.

7. The computer system of claim 1, wherein the processor is further configured to
   determine a closest path connecting involved services with each other.

8. The computer system of claim 1, wherein the DAG G is a tuple G=(N, L, F, W) which includes:
   a finite set of vertices or nodes N,
   a finite set of vertices connecting transitions or links L,
   a set of functions F describing a general dynamic behavior of a defined graph, such as bidirectional relationship like ancestor, predecessor or adjacency matrix, and
   a weighting function W: L→$\mathbb{R}$, where $\mathbb{R}$ is a real number, of the DAG is defined consistent with the following:
     for s sequential, p parallel, i iterative, b boolean, c a total amount of service calls, $e_{kpi}$ an empirical coefficient, and d a distance between a source node and a destination node of a traversal of a one of the service calls, $$w(l) = \sum_{source}^{destination} \frac{\left(\left(s + p + i + \frac{b}{2}\right) * c * e_{kpi}\right)}{d(source, destination)}.$$

9. A method to perform a transitive traversal service discovery, comprising:
   providing, by a processor, a service composition tree of services which are offered, wherein the tree is hierarchical and specifies relationships of the services which are offered within the service composition tree to each other;
   translating, by the processor, plural trees of service composition and the relationships of the services represented in the plural trees into a directed acyclic graph (DAG) that represents the plural trees of service composition, the DAG being redundancy-free; and
   performing, by the processor, a transitive traversal within the DAG among the services represented in the DAG to locate information, within the DAG, regarding the services, in relation to each other,
   wherein the DAG is stored in an electronic storage that is accessed by the processor,
   wherein a service composition is a collection of interdependent services, each of the services in the service composition is represented as its own separate structure which is separate from other services in the service composition,
   wherein links in the DAG are weighted with regard to performance characteristics of the services.

10. The method of claim 9,
    wherein the services which are in the trees of service composition are formatted according to a service description language format,
    further comprising translating data of the services contained in the service description language format in the service composition tree are translated into the DAG, and
    prescribing a direction among nodes representing services within the DAG from interdependencies of the services which are determined from the plural trees of service composition.

11. The method of claim 9, further comprising structuring the DAG to conserve links that already associate services represented by nodes in the service composition tree with each other, interpreted through a transitive path traversal of the links.

12. The method of claim 9, further comprising
receiving a search query that specifies a requested service;
propagating, in response to the search query, in the DAG, the search query for the requested service; and
returning a query result from the search query that was propagated in the DAG.

13. The method of claim 9, further comprising
performing service discovery in the DAG using query filter criteria and selective conditions.

14. The method of claim 9, further comprising
orchestrating services in the DAG to keep a consistency in a service composition throughout the DAG.

15. The method of claim 9, further comprising
determining a closest path connecting involved services with each other.

16. The method of claim 9, wherein the DAG G is a tuple G=(N, L, F, W) which includes:
a finite set of vertices or nodes N,
a finite set of vertices connecting transitions or links L,
a set of functions F describing a general dynamic behavior of a defined graph, such as bidirectional relationship like ancestor, predecessor or adjacency matrix, and
a weighting function W: $L \to \mathbb{R}$, where $\mathbb{R}$ is a real number, of the DAG is defined consistent with the following:
for s sequential, p parallel, i iterative, b boolean, c a total amount of service calls, $e_{kpi}$ an empirical coefficient, and d a distance between a source node and a destination node of a traversal of a one of the service calls, $$w(l) = \sum_{source}^{destination} \frac{\left(\left(s+p+i+\frac{b}{2}\right)*c*e_{kpi}\right)}{d(source, destination)}.$$

17. A non-transitory computer readable medium comprising executable instructions for a method for transitive traversal service discovery, the instructions being executed to perform:
providing a service composition tree of services which are offered, wherein the tree is hierarchical and specifies relationships of the services which are offered within the service composition tree to each other;
translating plural trees of service composition and the relationships of the services represented in the plural trees into a directed acyclic graph (DAG) that represents the plural trees of service composition, the DAG being redundancy-free; and
performing a transitive traversal within the DAG among the services represented in the DAG to locate information, within the DAG, regarding the services, in relation to each other,
wherein the DAG is stored in an electronic storage,
wherein a service composition is a collection of interdependent services, each of the services in the service composition is represented as its own separate structure which is separate from other services in the service composition,
wherein links in the DAG are weighted with regard to performance characteristics of the services.

18. A computer system, comprising:
a processor, the processor is configured to:
provide a service composition tree of services which are offered, wherein the tree is hierarchical and specifies relationships of the services which are offered within the service composition tree to each other;
translate plural trees of service composition and the relationships of the services represented in the plural trees into a directed acyclic graph (DAG) that represents the plural trees of service composition, the DAG being redundancy-free; and
perform a transitive traversal within the DAG among the services represented in the DAG to locate information, within the DAG, regarding the services, in relation to each other; and
an electronic storage cooperatively operable with the processor, and configured to store the DAG,
wherein a service composition is a collection of interdependent services, each of the services in the service composition is represented as its own separate structure which is separate from other services in the service composition,
wherein the DAG includes: a set of functions describing a general dynamic behavior of a defined graph, and a weighting function with regard to performance characteristics of the services.

19. A method to perform a transitive traversal service discovery, comprising:
providing, by a processor, a service composition tree of services which are offered, wherein the tree is hierarchical and specifies relationships of the services which are offered within the service composition tree to each other;
translating, by the processor, plural trees of service composition and the relationships of the services represented in the plural trees into a directed acyclic graph (DAG) that represents the plural trees of service composition, the DAG being redundancy-free; and
performing, by the processor, a transitive traversal within the DAG among the services represented in the DAG to locate information, within the DAG, regarding the services, in relation to each other,
wherein the DAG is stored in an electronic storage that is accessed by the processor,
wherein a service composition is a collection of interdependent services, each of the services in the service composition is represented as its own separate structure which is separate from other services in the service composition,
wherein the DAG includes: a set of functions describing a general dynamic behavior of a defined graph, and a weighting function with regard to performance characteristics of the services.

20. A non-transitory computer readable medium comprising executable instructions for a method for transitive traversal service discovery, the instructions being executed to perform:
providing a service composition tree of services which are offered, wherein the tree is hierarchical and specifies relationships of the services which are offered within the service composition tree to each other;
translating plural trees of service composition and the relationships of the services represented in the plural trees into a directed acyclic graph (DAG) that represents the plural trees of service composition, the DAG being redundancy-free; and
performing a transitive traversal within the DAG among the services represented in the DAG to locate information, within the DAG, regarding the services, in relation to each other, wherein the DAG is stored in an electronic storage,
wherein a service composition is a collection of interdependent services, each of the services in the service composition is represented as its own separate structure which is separate from other services in the service composition,
wherein the DAG includes: a set of functions describing a general dynamic behavior of a defined graph, and a weighting function with regard to performance characteristics of the services.

* * * * *